(12) United States Patent
Grünert et al.

(10) Patent No.: US 8,383,988 B2
(45) Date of Patent: Feb. 26, 2013

(54) GLASS PANE AND GLASS PANE ARRANGEMENT

(75) Inventors: Jan Grünert, Hamburg (DE); Wolfgang Von Avenarius, Herzogenrath (DE); Dang Cuong Phan, Aachen (DE)

(73) Assignee: Saint-Gobain Glass France, Aubervilliers (FR)

( * ) Notice: Subject to any disclaimer, the term of this patent is extended or adjusted under 35 U.S.C. 154(b) by 337 days.

(21) Appl. No.: 12/811,211

(22) PCT Filed: Dec. 3, 2008

(86) PCT No.: PCT/EP2008/010216
§ 371 (c)(1),
(2), (4) Date: Aug. 18, 2010

(87) PCT Pub. No.: WO2009/086869
PCT Pub. Date: Jul. 16, 2009

(65) Prior Publication Data
US 2010/0314378 A1    Dec. 16, 2010

(30) Foreign Application Priority Data
Jan. 4, 2008   (DE) .......................... 10 2008 003 219

(51) Int. Cl.
*B60L 1/02*    (2006.01)

(52) U.S. Cl. ........................................................ 219/203

(58) Field of Classification Search ................... 219/203
See application file for complete search history.

(56) References Cited

U.S. PATENT DOCUMENTS

| | | | | |
|---|---|---|---|---|
| 5,653,903 | A | 8/1997 | Pinchok, Jr. et al. | 219/203 |
| 6,492,619 | B1 * | 12/2002 | Sol | 219/203 |
| 6,559,419 | B1 | 5/2003 | Sol et al. | 219/203 |
| 6,734,396 | B2 * | 5/2004 | Sol et al. | 219/203 |
| 7,223,940 | B2 * | 5/2007 | Voeltzel et al. | 219/203 |
| 2002/0015824 | A1 * | 2/2002 | Kawamoto et al. | 428/156 |
| 2004/0026397 | A1 | 2/2004 | Degand | 219/203 |
| 2007/0187382 | A1 | 8/2007 | Mauser | 219/203 |

FOREIGN PATENT DOCUMENTS

| | | |
|---|---|---|
| EP | 0800333 | 9/1998 |
| EP | 1 466 877 | 10/2004 |
| EP | 1605729 | 12/2005 |

OTHER PUBLICATIONS

International Search Report for PCT/EP2008/010216 filed on Mar. 12, 2008 in the name of Saint-Gobain Glass France.
Written Opinion for PCT/EP2008/010216 filed on Mar. 12, 2008 in the name of Saint-Gobain Glass France.

* cited by examiner

*Primary Examiner* — Anthony Ho
(74) *Attorney, Agent, or Firm* — Steinfl & Bruno, LLP

(57) ABSTRACT

The invention relates to a glass pane, comprising at least two individual panes and an adhesive layer located in between them, with the glass pane having a local heating area which only extends over part of the overall area of the pane and which can be heated by means of a heating element.

5 Claims, 2 Drawing Sheets

GLASS PANE AND GLASS PANE ARRANGEMENT

CROSS REFERENCE TO RELATE APPLICATIONS

Figure 1A:
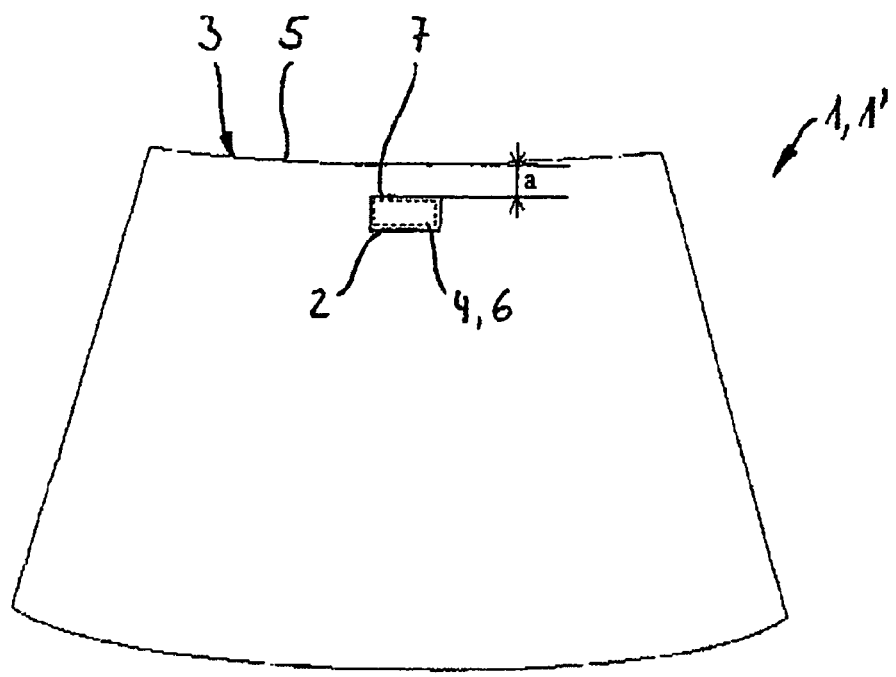

The present applications is the US national stage of International Application PCT/EP2008/010216 filed on Dec. 3, 2008 which, in turn, claims priority to German Application DE 102008003219.0, filed Jan. 4, 2008.

PRIOR ART

The invention relates to a glass pane, comprising at least two individual panes and an adhesive layer located in between them, with the glass pane having a local heating area which only extends over part of the overall area of the pane and which can be heated by means of a heating element.

Furthermore, the invention relates to a glass pane arrangement, comprising a glass pane formed by at least two individual panes and an adhesive layer located in between them, and at least one optical functional element arranged on one side of the glass pane and which sends signals to the opposite side of the glass pane and/or
receives signals from the opposite side of the glass pane through an optical transmission region of the glass pane, and a local heating area which only extends over part of the overall area of the glass pane, but which at least extends over the entire transmission region, with the transmission region being at a distance from an end face of the glass pane in all directions.

Within the scope of the present application, the end face of the glass pane is understood to be the side face of the glass pane which runs around the outermost edge of the glass pane. Accordingly, the end face has a depth formed by the thickness of the two individual panes and, additionally, the thickness of the adhesive layer arranged in between them.

Furthermore, the invention relates to a glass pane arrangement comprising a glass pane formed by at least two individual panes and an adhesive layer located in between them, and at least two optical functional elements arranged at a distance from one another on the same side of the glass pane and which send signals to the opposite side of the glass pane and/or
receive signals from the opposite side of the pane through in each case one optical transmission region of the glass pane, and at least one heating area which extends over both of the transmission regions which are at a distance from one another.

Portions of vehicle panes, in particular windscreens, have to be kept free from condensation, rain and/or ice during the journey. This is typically the case in regions in which for example rain sensors for automatic control of the windscreen wipers or distance sensors for automatic detection of the distance to a vehicle driving ahead are arranged. The position of such a sensor is typically arranged in the region of the pane in which the rear-view mirror is arranged, typically between the attachment region of the rear-view mirror bracket and the roof edge of the vehicle body. A further region which can at least be kept ice-free for reasons of comfort is the region in which the wiper blades of the windscreen wiper rest against the windscreen or a rear window.

According to the present application, the region or regions of the pane which are kept free or intended to be kept free for the function of the respective sensors, or for operation of the windscreen wipers, are defined as transmission regions, with the transmission region being kept free from ice, rain or condensation by arranging heating areas, with the size of the heating area not having to correspond to the size of the transmission region.

In the case where two optical functional elements, such as a transmitter and a receiver, are arranged adjacently at a required distance from one another in a region of the windscreen, two transmission regions are required which in turn have to be kept free from the influences of the weather by means of two heating areas.

EP 0 800 333 A2 describes a windscreen provided with a heating area along its longitudinal side facing the engine bonnet, the heating wires of which being arranged in between the two individual panes forming the glass pane. Accordingly, the heating area is located in the region of the windscreen wipers and it can optionally be additionally guided along the short sides as well.

EP 1 605 729 A2 is mentioned as an example of a heating area arranged in the region of the rear-view mirror. A windscreen is described therein which has, arranged on its side facing the inside of the vehicle, a camera used to detect the driven route. As mentioned previously, it is necessary for this purpose to keep at least that region of the pane through which the camera looks free from the influences of the weather; this is effected by arranging heating elements in the region of a heating area. The heating elements are likewise heating wires arranged between the two individual panes forming the windscreen.

Heating a region of a windscreen requires a relatively large amount of energy, which is why the local heating areas are typically intended to have dimensions which are as small as possible. Furthermore, the heating elements are visible in the pane; this is detrimental to the optical properties of the pane and is why the arrangement of heating elements is only permitted in a region outside of a statutorily defined field of view of the windscreen (in particular a so-called A-field of view or B-field of view), that is to say it is accordingly only permitted in the edge region of the pane.

A disadvantage of the arrangement of local heating areas is that there is a temperature difference between the local heating area and the surrounding region of the vehicle pane while the heating elements are operational and this leads to non-negligible stresses in the pane, particularly around the heating area. This can be traced to the fact that the vehicle pane warms up in the region of the heating area and consequently expands, resulting in tensile stress and compressive stress in the surrounding region. For example, if a heating area is in the region of the rear-view mirror, that is to say in the upper edge region of the pane, only a thin unheated strip remains between the heating area and the upper edge of the pane, and the stresses become particularly high in this unheated strip.

According to the present application, the edge of the glass pane is considered to be the line of intersection of the plane of one of the outer pane surfaces with the outermost plane formed by the typically chamfered end face of the pane (line of intersection of two tangential planes).

If regions of a vehicle pane are stressed as described above, they are much more susceptible to additional forces acting on the pane and the additional stresses resulting therefrom. In particular, in the case of stone impact on such areas, it is possible for a crack to be created which, in a worst case scenario, can lead to complete destruction of the pane.

Object

It is therefore the object of the present invention to develop a glass pane or a glass pane arrangement of the type mentioned initially in such a manner that the stresses generated by the heated regions of the glass pane are minimized and the risk of damage to the pane by the formation of cracks after stone impact is reduced.

Solution

According to the invention, in the case of the glass pane with one local heating area which can be heated by means of one heating element, and the glass pane arrangement with at least one optical functional element and one local heating area, the object is achieved by the distance between the heating area and the end face of the glass pane being less than 15 mm and preferably less than 10 mm.

If the heating area is guided that closely to the end face, then the heated area extends to the outermost edge of the pane due to a certain amount of thermal conduction, that is to say it accordingly extends to the end face of the pane, so that no thin strip remains in which the stresses caused by the temperature difference would be particularly high.

According to the concept of the invention, the heating area is deliberately enlarged to the critical edge region of the pane, even though the transmission region does not necessarily extend that far. Hence, according to the invention, a larger area is typically heated than would be required for achieving the desired effect by means of the heating.

While conducting a sequence of tests, it became apparent that the glass pane according to the invention is significantly more resilient and less susceptible to stone impact damage than conventional glass panes. Conversely, it was consequently found that the critical region in which the heating area is arranged is at a certain distance from the edge of the pane: if a distance of less than approximately 100 mm remains between the heating area and the outermost pane edge, high thermal stresses are generated in the edge region of the pane, which, particularly in the case of stone impact, reduce the bearing strength of the pane to the extent that it can crack.

Although the invention continues to generate certain stresses in the remaining surrounding regions of the heating area, these regions have significantly larger dimensions and so the stresses occurring there are correspondingly smaller.

Overall, the arrangement of the heating area according to the invention minimizes the stresses caused by its operation and hence increases the resilience of the pane.

Inasmuch as this is technically possible, the heating area can likewise extend directly to an end face of the glass pane, with a certain overlap of the heating elements arranged in the heating area possibly having to be taken into account.

As already mentioned initially, the dimensions of the heating area and the optical transmission region do not have to be congruent. Due to thermal conduction, the region of the pane heated by the heating area is in general slightly larger than the heating area itself, which is formed by its heating elements. It is for this reason that it is theoretically possible to choose dimensions of the heating area which are slightly smaller than those of the transmission region; however, the dimensions of the heating area are typically selected to be slightly larger than those of the transmission region. According to the present invention, this results in the heating area being brought close to the end face or edge of the glass pane, while the transmission region is at a larger distance from the edge of the pane.

In any case, the heating area, that is to say the elements carrying out the heating effect, must be brought that close to the edge of the pane that said area substantially has the same temperature as the rest of the heating area during the heating operation.

The design according to the invention is advantageous in particular when the distance between the transmission region and the end face of the glass pane is between 100 mm and 20 mm, in particular also between 80 mm and 40 mm, and more preferably between 70 mm and 50 mm. In the case where the distance of the transmission region from the edge is more than 100 mm, an unheated area towards the edge of the pane is no longer considered critical with respect to stress considerations and so "heating through" to the edge is no longer necessary.

According to the invention, if the initially described glass pane arrangements with two optical functional elements, arranged at a distance from one another, and at least one heating area are used as a starting point, the object is achieved by the heating area also completely extending over an intermediate space located between the two transmission regions.

In this case, the invention also yields the advantage that no thin strip, unheated by heating areas, remains between the two functional elements so that stresses caused by a temperature difference cannot occur either, which in turn could have increased the susceptibility of the glass pane towards cracks. This positive effect is noted in particular if the distance between the two transmission regions requiring the heating areas is less than 100 mm. It is not essential to also extend a heating area over the intermediate space between the transmission regions in the case of distances greater than 100 mm because the problems with stress do not occur in this case.

The invention can be applied in a particularly expedient manner with respect to the distance between adjacent transmission regions if, analogously to the distance between the transmission region and the end face of the glass pane, the previously mentioned distance lies between 100 mm and 20 mm, preferably between 80 mm and 40 mm, and more preferably between 70 mm and 50 mm.

It is advantageous if the intermediate space between adjacent transmission regions is located between two lines which are tangent to the contour lines of the transmission regions on the same side of the transmission regions. This is particularly advantageous in the case of two neighboring transmission regions which do not have the same size or shape.

Means should be selected for the design of the heating element which are not, or hardly, optically visible in the glass pane. For this reason, it is advantageous if the heating element has heating wires which can be heated electrically and/or a transparent heating layer which can be heated electrically.

With regard to the adhesive layer between the two individual panes, it is particularly advantageous if it is formed by a thermoplastic film, in particular by a polyvinyl butyral film (PVB film).

In order to expediently limit the energy consumption for heating the heating area, the local heating area should at most extend over 50% of the overall area of the glass pane. Preferably, the local heating area should not amount to more than 40%, more preferably more than 30%, of the overall area of the glass pane.

Advantageously, the optical functional element is a camera, a rain sensor, a sending unit or a receiving unit, or a combined sending-receiving unit of a system for vehicle control.

EXEMPLARY EMBODIMENT

Figure 1B:
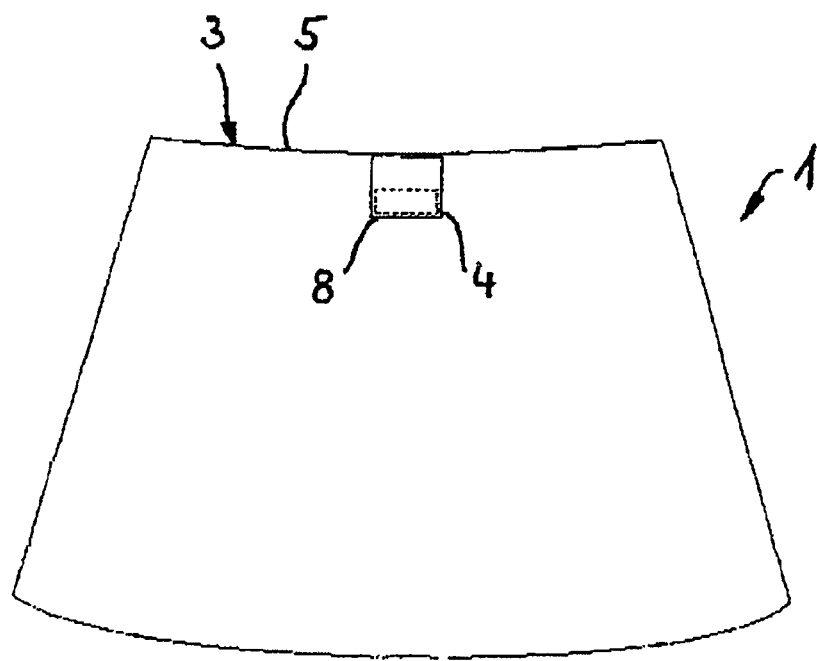
Figure 2A:
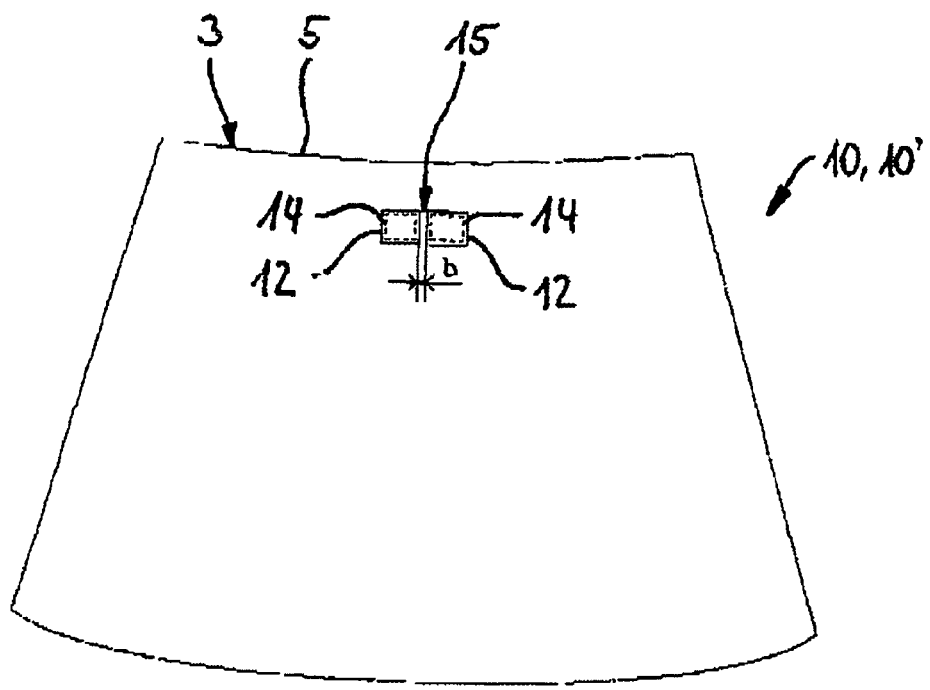
Figure 2B:
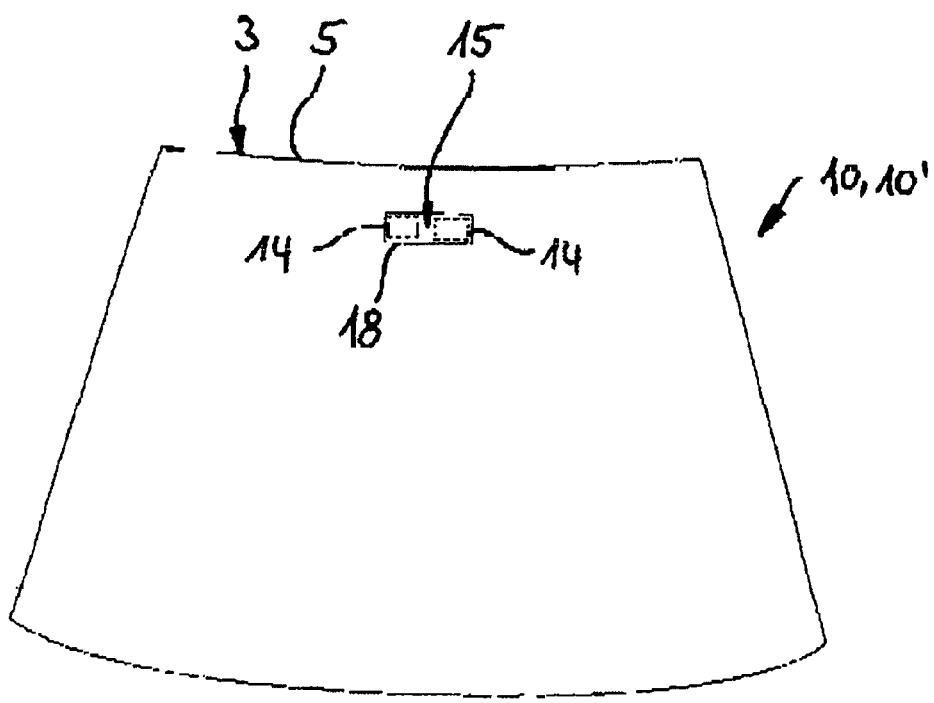

The invention will be explained in more detail below on the basis of exemplary embodiments illustrated in the drawings, in which FIG. 1a shows a glass pane according to the prior art, FIG. 1b shows a first exemplary embodiment of a glass pane according to the present invention, FIG. 2a shows a further glass pane according to the prior art, and FIG. 2b shows a second exemplary embodiment of a glass pane according to the present invention.

FIG. 1a schematically illustrates a view of a glass pane 1, or a glass pane arrangement 1', which sketches the position of a local heating area 2 according to the prior art. The glass pane 1 comprises two individual panes, which are held together by means of an adhesive layer located in between them. An optical functional element, in particular a camera, is arranged on the glass pane 1 (which is in the form of a windscreen); however, the camera is not illustrated in the figure for the sake of a better overview.

Since optical functional elements arranged on the windscreen are always at a certain distance from an end face 3 of the glass pane 1 due to structural reasons, the heating area 2, which is used to heat a defined optical transmission region 4, is likewise at a distance a from the end face 3 of the glass pane 1 (which is shown in the figure as the outermost edge 5 of the glass pane 1). The optical transmission region 4 is defined as that region of the pane which has to in any case be kept free from influences of the weather such as rain, snow or ice so that the optical functional element functions. The optical transmission region 4 and the heating area 2 are substantially congruent in the prior art; the heating area 2 typically extends slightly beyond the contour lines 6 of the transmission region 4 in all directions, with the contour lines 6 being drawn as dashed lines in the figures.

The distance a between the heating area 2 and the upper end face 3 of the glass pane 1 is approximately 50 mm in FIG. 1a so that a strip with a width of 50 mm, corresponding to the distance a, remains between the upper side line 7 of the heating area 2 and the edge 5 of the glass pane 1. A disadvantage of the arrangement of the heating area 2 according to the prior art shown in FIG. 1a is that there is a large temperature difference between the region of the glass pane 1 heated by the heating area 2 and the surrounding region while the heating area 2 is operational so that there are high thermal stresses particularly in the abovementioned strip.

FIG. 1b shows a glass pane 1 analogous to the one shown in FIG. 1a, with the arrangement of the local heating area 8 according to the invention being illustrated in FIG. 1b. The heating area 8 is likewise arranged in the upper edge region of the glass pane 1, but it extends up to the end face 3 of the latter so that no strip remains between the heating area 8 and the upper edge 5 of the glass pane; this has a positive effect on the thermal stress distribution in the glass pane 1.

The local heating area 8 has a transparent heating layer which can be heated electrically as a heating element. Alternatively, it is possible for the heating element to comprise heating wires which can be heated electrically. Due to the thermal conduction in the glass pane 1, it is not necessarily a requirement to guide the heating area 8 directly to the edge 5 of the glass pane 1; rather, it is sufficient if a distance a of approximately 10 to 15 mm remains between the heating area 8 and the end face 3 of the glass pane 1 in order to use thermal power emitted by the heating area 8 to heat the glass pane 1 up to the end face 3.

The heating area 8 according to the present invention is significantly larger than would actually be required for keeping clear the transmission region 4, which lies at a distance from the end face 3 of the glass pane 1, since the heating area 8 is extended to the outermost edge of the pane starting from the conventional position.

FIG. 2a on the other hand shows a view of a schematically illustrated glass pane 10, or glass pane arrangement 10', which sketches the position, known from the prior art, of two heating areas 12, arranged at a distance b from one another, for two adjacent optical transmission regions 14 of functional elements. An intermediate space 15 which is not heated by the heating areas 12 remains between the two heating areas 12 so that large thermal stresses can also occur here which increase the susceptibility to cracks of the windscreen in the case of stone impact.

According to the present invention, the two abovementioned heating areas 12 are replaced by a continuous heating area 18 illustrated in FIG. 2b, which extends over both of the two required transmission regions 14 and the intermediate space 15. Accordingly, the two heating areas 12 according to the prior art are, according to the invention, merged into one heating area 18. Consequently a region situated between the transmission regions 14 is also heated.

Combining two heating areas 12 which are to be arranged next to one another into a heating area 18 as illustrated in FIG. 2b is expedient in particular if the distance between the transmission regions 14 requiring the heating areas 12 is less than 100 mm, which corresponds to the upper limit of the critical distance.

The invention claimed is:

1. A glass pane, comprising at least two individual panes and an adhesive layer located between at least two individual panes, the glass pane comprising a local heating area which only extends over part of an overall area of the glass pane, which local heating area is adapted to be heated by way of a heating element, the local heating area being located at a distance from an end face of the glass pane, a distance being selected to prevent additional, thermally induced mechanical stresses, the glass pane further comprising at least two optical functional elements arranged at a distance from one another on a same side of the glass pane and which are adapted to send signals to an opposite side of the glass pane and/or receive signals from the opposite side of the glass pane through a respective one optical transmission region of the glass pane, wherein the local heating area is at least one heating area which extends over both transmission regions which are at a distance from one another, wherein the heating area also completely extends over an intermediate space located between the two transmission regions.

2. The glass pane according to claim 1, wherein a distance between adjacent transmission regions lies between 100 mm and 20 mm.

3. The glass pane according to claim 1, wherein the intermediate space between adjacent transmission regions is located between two lines which are tangent to contour lines of the transmission regions on a same side of the transmission regions.

4. The glass pane according to claim 2, wherein the distance between adjacent transmission regions lies between 80 mm and 40 mm.

5. The glass pane according to claim 4, wherein the distance between adjacent transmission regions lies between 70 mm and 50 mm.

* * * * *

UNITED STATES PATENT AND TRADEMARK OFFICE
CERTIFICATE OF CORRECTION

PATENT NO. : 8,383,988 B2  Page 1 of 1
APPLICATION NO. : 12/811211
DATED : February 26, 2013
INVENTOR(S) : Grünert et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 379 days.

Signed and Sealed this
First Day of September, 2015

Michelle K. Lee
*Director of the United States Patent and Trademark Office*